Jan. 23, 1951     E. WILDHABER     2,538,999
METHOD OF PRODUCING TOOTHED COUPLING MEMBERS
Filed July 31, 1945     3 Sheets-Sheet 1
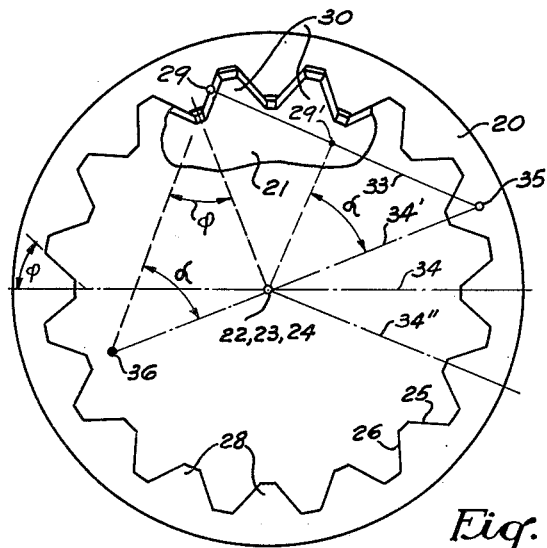
Fig. 1
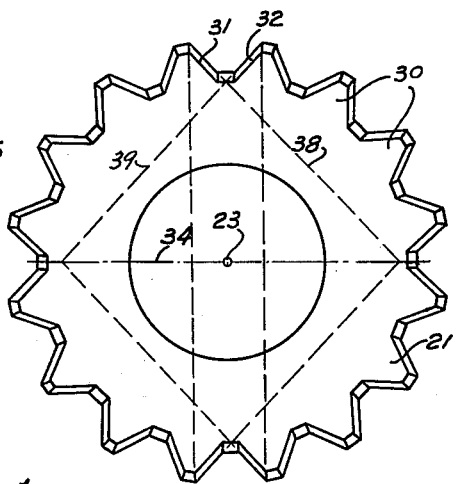
Fig. 3
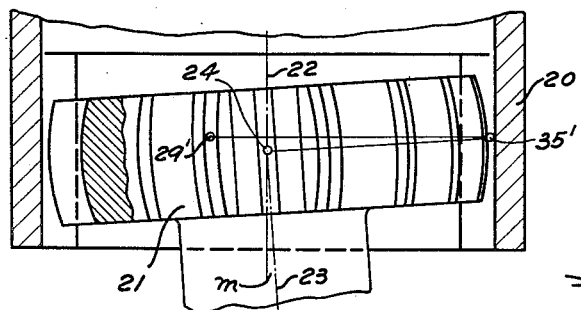
Fig. 2
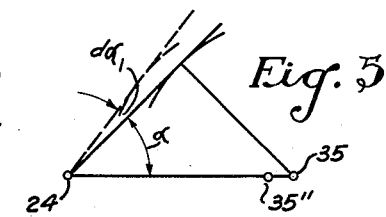
Fig. 5
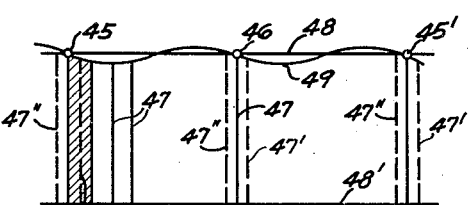
Fig. 6
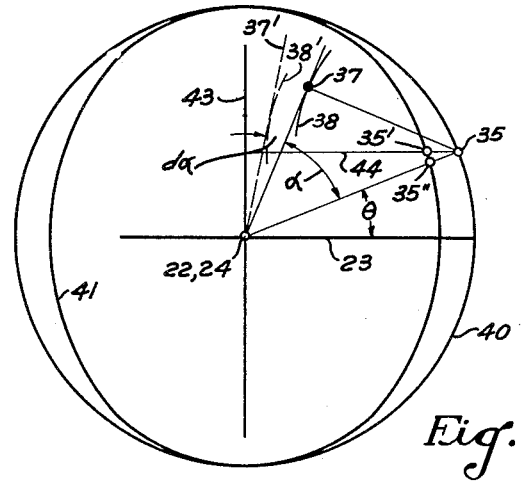
Fig. 4
Fig. 7
INVENTOR.
ERNEST WILDHABER
BY
B. V. Schlesinger Jan. 23, 1951  E. WILDHABER  2,538,999
METHOD OF PRODUCING TOOTHED COUPLING MEMBERS
Filed July 31, 1945  3 Sheets-Sheet 2

INVENTOR.
ERNEST WILDHABER
BY *B. E. Schlesinger*

Jan. 23, 1951          E. WILDHABER          2,538,999
METHOD OF PRODUCING TOOTHED COUPLING MEMBERS
Filed July 31, 1945          3 Sheets—Sheet 3
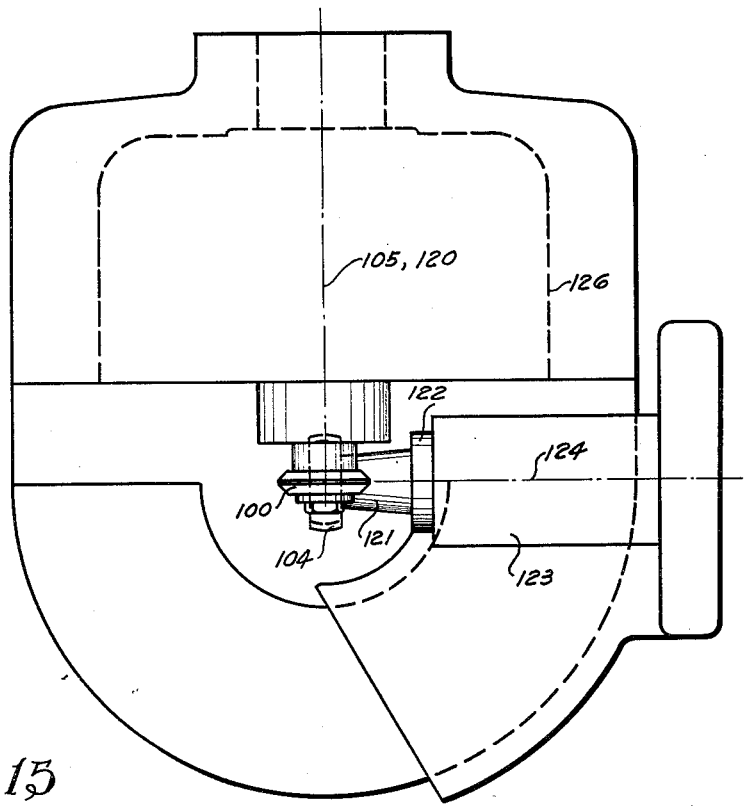
Fig. 15
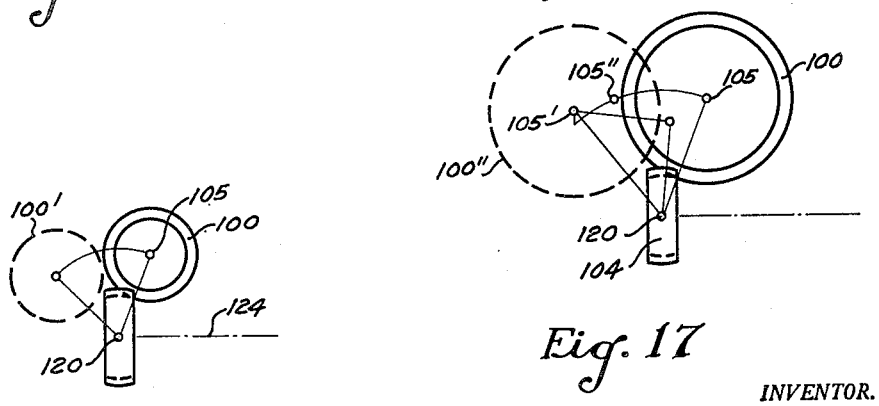
Fig. 16
Fig. 17
INVENTOR.
ERNEST WILDHABER
BY Patented Jan. 23, 1951

2,538,999

UNITED STATES PATENT OFFICE 2,538,999

METHOD OF PRODUCING TOOTHED COUPLING MEMBERS

Ernest Wildhaber, Brighton, N. Y., assignor to Gleason Works, Rochester, N. Y., a corporation of New York Application July 31, 1945, Serial No. 608,071

9 Claims. (Cl. 90—9.4)

The present invention relates to toothed couplings and particularly to toothed couplings of the type constructed to maintain driving connection between two rotating parts even when the parts are in angular misalignment. In a more particular aspect, the invention relates to toothed couplings in which one member is an internally toothed member and the other member is an externally toothed member and in which the tooth sides of at least one member are crowned in order to permit the teeth of the two members to remain in power transmitting engagement in spite of angular misalignment of the two members and the parts which they connect.

Ordinarily, in toothed couplings of the character described, the teeth of the internal member are straight longitudinally and the teeth of the external member are crowned so as to be longitudinally convex. The crowning of the teeth of the external member enables the coupling to transmit power in spite of moderate angularity between the axes of the shafts connected by the coupling. Hence, the coupling has to a limited degree the function of a universal joint and may be called a semiuniversal coupling.

Heretofore, coupling members of the type described were simply designed along the lines of internally and externally toothed gears. The profiles and pressure angles or tooth inclinations of the coupling members were simply taken over from gear design. The teeth of the coupling members were provided with involute tooth profiles because external and internal spur gears ordinarily have involute profiles, and the pressure angles employed on the teeth of the coupling members were the conventional pressure angles used for external and internal gears. Couplings constructed in this way have, however, limited load carrying capacity when misaligned and other disadvantages.

One object of the present invention is to provide an improved coupling of the internally-externally toothed type which will have smoother action and increased load capacity as compared with prior design.

Another object of the invention is to provide a toothed coupling of the character described in which the coupling members may have tooth profile shapes which will permit of increased angular misalignment of the parts and which will still allow greater loads to be carried when the parts are in misalignment. To this end, it is a further purpose of the invention to provide a toothed coupling in which the tooth surfaces may have larger pressure angles, partly for increased strength and partly to permit more crowning to be used on the teeth thereby to improve the action of the coupling.

A further object of the invention is to provide a coupling of the character described in which one member of the coupling will be capable of centering itself with respect to the other member.

A still further object of the invention is to provide one embodiment of toothed coupling of the character described having positive centering means so that the axes of the shafts connected by the couplings are made to intersect positively and at a definite point.

A further object of the invention is to provide a toothed coupling of the character described which can be produced accurately at low cost by either cutting or grinding.

Another object of the invention is to provide simple, inexpensive methods for producing the members of my new coupling.

Still another object of the invention is to provide a process for cutting toothed coupling members of the character described so that the two members of a coupling will be conjugate to one another and transmit correct motion.

A further object of the invention is to provide a process whereby two tooth surfaces of each member of the coupling of this invention may be cut or ground simultaneously.

A still further object of the invention is to provide a method for cutting toothed couplings of the character described with which full control of the length of bearing or tooth contact on both sides of the teeth of the engaging coupling members may be had.

Other objects of the invention will be apparent hereinafter from the specification and from the recital of the appended claims.

In the drawings:

Fig. 1 is an end elevation of an internal coupling member constructed according to one embodiment of this invention and showing fragmentarily the mating external member in engagement therewith, and further illustrating some of the principles on which the present invention is based;

Fig. 2 is a view taken at right angles to the view of Fig. 1 and showing the internal member wholly and the external member partly in axial section;

Fig. 3 is an end view of the external member of the coupling;

Figs. 4 and 5 are diagrammatic views explaining certain principles underlying the invention;

Fig. 6 is a velocity diagram of the motion of the coupling members;

Fig. 7 is a velocity diagram of the motion of the driven member of the coupling grossly exaggerated;

Fig. 15 is a diagrammatic view showing how the external member of the coupling may be produced on an existing type of spiral bevel gear generating machine;

Fig. 16 is a diagrammatic view showing one way in which this machine may be operated to produce this member of coupling; and Fig. 17 is a diagrammatic view illustrating another way in which this machine may be operated to produce this member of the coupling.

Figure 8:
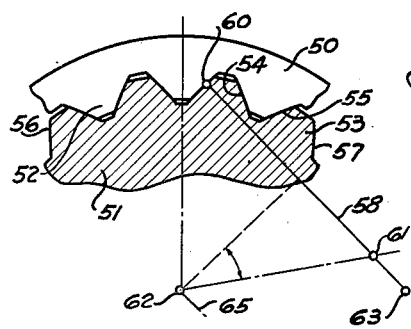
Fig. 8 is a fragmentary view showing a coupling built according to a modification of the invention.

In coupling members constructed according to the present invention, both members of the coupling pair are made with straight or very slightly curved tooth profiles. As will be demonstrated hereinafter, this gives increased tooth strength and better action.

In Figs. 1 to 3 inclusive, 20 denotes the internally toothed member and 21 the externally toothed member of a coupling pair constructed according to one embodiment of the invention. The axis of the internal member is denoted at 22 and the axis of the external member at 23. In Fig. 2, the two coupling members are shown angularly misaligned and the point of intersection of their axes is denoted at 24.

The oppostie side surfaces 25 and 26 of the teeth 28 of the internally toothed member 20 are planes which are parallel to the axis 23 of that member. The teeth are symmetrical and have equal pressure angles on opposite sides. The term "pressure angle" as here used, means half the included angle between opposite sides 25 and 26 of a tooth of the internal member or a tooth space of the external member, and is denoted at $\phi$ in Fig. 1. In coupling members constructed according to this invention the pressure angle of the tooth sides is preferably made larger than 25 degrees. This is considerably different from the pressure angles heretofore used on internal-external toothed couplings, for the pressure angles of internal gears ordinarily run from 6 degrees to 20 degrees as the limit.

The teeth 30 of the externally toothed member 21 have side surfaces 31 and 32 which, like the side surfaces of the internally tooth member 20, have straight profiles, but the side surfaces 31 and 32 of member 21 are of convex lengthwise shape, that is, they are longitudinally crowned. The opposite sides 31 and 32 of a tooth space of the external member are conical surfaces and preferably are made as coaxial conical surfaces. Two of such surfaces are shown at 38 and 39 in Fig. 3. The common axis 34 of these surfaces is perpendicular to the axis 23 of the member 21 and passes through the longitudinal center 24 of that member. The center 24 constitutes the point of intersection of the axes 22 and 23 of the two coupling members when they are in use.

The normal 33 to a conical tooth side of the coupling member 21 at a mean point 29 (Fig. 1) of contact between the two coupling members intersects the axis 34' of said conical tooth side at a point 35 which is the center of lengthwise tooth curvature of the tooth surface at mean point 29. Let the cone angle of the conical tooth surface be denoted by $a$. It is the angle between an element 29—36 of the conical tooth surface and the axis 34' of the tooth surface.

The action of the coupling will now be analyzed with reference to the diagram of Fig. 4 which refers to a position of misalignment of the axes 22 and 23 of the two coupling members. The point of intersection of the two axes is again denoted at 24. It is also the point of intersection of the axes of the several conical tooth sides of the external member 30. The position of the intersection point 24 is maintained through natural balance by the engagement of diametrically opposite teeth of the clutch members, or it may also be maintained positively as will be described further hereinafter.

The motion between the two coupling members will first be analyzed as if only a single tooth of each was in engagement and as if the other teeth of the coupling members did not exist.

Fig. 4 is a view along the axis 22 of the internal member. The circle 40 is the path of the center 35 of lengthwise curvature of a tooth surface of the external member 21 when the axes 22 and 23 of the two coupling members are in alignment. 24—37 is a straight line drawn through center 24 tangent to a circle 38 drawn about center 35 with a radius 35—37 equal to:

$$(24-35) \cdot \sin a$$

Line 24—37 is parallel to that tooth profile of the internal member which is engaged when point 29 is the point of contact.

If the external member 21 is now set to an angular position with reference to the internal member with its axis 23 inclined to the axis 22 of the internal member without changing the angular position of the center 35 about axis 23, that is without changing the turning angle $\theta$ of member 21, the axis 23 of member 21 will be projected as a horizontal line, and the point 35 will move in a circle about an axis 43 perpendicular to axis 23 to a new position 35'. The plane of this circile is perpendicular to the drawing plane of Fig. 4 so that it is projected as a straight line 44. The new position of the line 24—37 is obtained by drawing the line 37' tangent to the circle 38' which is circumscribed about the new center 35' with the radius 35—37.

Fig. 4 is a view along the axis of the internal member and therefore also along the plane tooth sides of this member and along planes parallel to these tooth sides. All said planes appear, therefore, as straight lines in Fig. 4. Moreover, the conical surface, which is drawn parallel to a conical tooth surface of coupling member 21 and which contains element 24—37, contacts with a plane drawn parallel to the mating plane tooth side of coupling member 20 in a line projected as line 37'. Furthermore, point 35 is at the same distance 35—37 from said plane as it is from the last named conical surface and from the plane 24—37. Hence, the above construction gives the exact turning displacement $d_a$ of the internal member. This displacement varies with the turning angle $\theta$ of the external member, $(\theta+\alpha+d\alpha)$ can be considered as the turning angle of the internal member. Here $d\alpha$ has a varying relationship to the turning angle $\theta$ of the external member, while $\alpha$ is a constant.

In analyzing the departure from uniform motion of one member as compared with the other, it is thus found that only the term $d\alpha$ affects it. The above construction for angle $d\alpha$ can be expressed by formulas and corresponding turning angles can then be exactly computed.

The problem can be greatly simplified by resorting to an approximation which is found to be excellent. Distance 35—35' is actually very small and is shown much exaggerated for the purposes of explanation. The misalignment angle $m$ shown in Fig. 2 is 3°, but this results actually in such a small distance 35—35' that this distance must be increased a hundred times to give distances such as shown in Fig. 4. With shaft misalignment, the circular path 40 of point 35 is projected as an ellipse 41 which actually is so close to circle 40 that it would be impossible to draw it separately were the conditions not exaggerated.

The small distance 35—35' can be resolved into a radial component 35—35'' and into a tangential component 35'—35'' perpendicular thereto. The radial component causes an angular displacement component $d\alpha_1$ of $d\alpha$ which is separately illustrated in Fig. 5. It is seen that:

$$\sin(\alpha+d\alpha_1) = \frac{(24-35)\sin\alpha}{(24-35'')} =$$

$$\frac{(24-35)\sin\alpha}{(24-35)-(35-35'')} = \frac{\sin\alpha}{1-\frac{(35-35'')}{(24-35)}}$$

$(35-35') = (24-35)\cos\theta - (24-35)\cos\theta\cos m$
$\quad = (24-35)\cos\theta(1-\cos m)$
$(35-35'') = (35-35')\cos\theta =$
$\quad\quad (24-35)\cos^2\theta(1-\cos m)$
$(35'-35'') = (35-35')\sin\theta =$
$\quad\quad (24-35)\sin\theta\cos\theta(1-\cos m)$ $$\frac{(35-35'')}{(24-35)} = \cos^2\theta(1-\cos m)$$

For very small angles $d\alpha$, measured in radians, $\sin(\alpha+d\alpha_1)$ can also be written as $$(\sin\alpha+\cos\alpha\cdot d\alpha_1)$$

Hence:

$$\sin\alpha+\cos\alpha\cdot d\alpha_1 = \frac{\sin\alpha}{1-\cos^2\theta(1-\cos m)}$$

This is a term of the nature of $$\frac{1}{1-x}$$

which can be put down as:

$$\frac{1}{1-x} = 1+x+x^2+\ldots$$

when $x$ is a small quantity, and in close approximation $=1+x$.

So:

$$\sin\alpha+\cos\alpha\cdot d\alpha_1 = \sin\alpha[1+\cos^2\theta(1-\cos m)]$$

and:

$$d\alpha_1 = \frac{\sin\alpha}{\cos\alpha}\cdot\cos^2\theta(1-\cos m)$$

$$= \tan\alpha\cos^2\theta(1-\cos m) \quad (1)$$

The tangential component 35'—35'' causes an angular displacement equal to $$d\alpha_2 = \frac{(35'-35'')}{(24-35'')}$$

$$= \frac{(35'-35'')}{(24-35)}$$

for very small distances (35—35'').

Hence:

$$d\alpha_2 = \sin\theta\cdot\cos\theta(1-\cos m) \quad (2)$$

and:

$$d\alpha = d\alpha_1 + d\alpha_2$$
$$= (1-\cos m)[\tan\alpha\cos^2\theta + \sin\theta\cos\theta] \quad (3)$$

in radians.

$$\cos^2\theta = \frac{1+\cos 2\theta}{2}$$

$$\sin\theta\cdot\cos\theta = \frac{\sin 2\theta}{2}$$

$$d\alpha = \frac{(1-\cos m)}{2}[\tan\alpha(1+\cos 2\theta)+\sin 2\theta]$$

$$= \frac{(1-\cos m)}{2}\left[\tan\alpha + \frac{\sin\alpha\cos 2\theta + \cos\alpha\sin 2\theta}{\cos\alpha}\right]$$

$$d\alpha = \frac{(1-\cos m)}{2}\left[\tan\alpha + \frac{\sin(\alpha+2\theta)}{\cos\alpha}\right] \quad (4)$$

Through differentiation:

$$\frac{d\alpha}{d\theta} = \frac{(1-\cos m)}{\cos\alpha}\cdot\cos(\alpha+2\theta) \quad (5)$$

This derivative is zero for a turning angle $\theta_0$ which may be determined from $(\alpha+2\theta_0)=90°$. $(\alpha+2\theta)$ can then also be put down as:

$$(90°-2\theta_0+2\theta)$$

and:

$$\cos(\alpha+2\theta) = -\sin(2\theta-2\theta_0)$$

Hence:

$$\frac{d\alpha}{d\theta} = -\frac{(1-\cos m)}{\cos\alpha}\cdot\sin(2\theta-2\theta_0)$$

$$= -\frac{(1-\cos m)}{\cos\alpha}\sin 2(\theta-\theta_0) \quad (6)$$

where $$\theta_0 = \frac{90°-\alpha}{2}$$

$$\frac{d\alpha}{d\theta}$$

can be considered as the variable part of the velocity of the internal member in proportion to the velocity of the external member.

$$\left(1+\frac{d\alpha}{d\theta}\right)$$

is the velocity of the internal member for unit velocity of the external member. This quantity is shown plotted in Fig. 6 as ordinates while the turning angles or angles of rotation $(\theta-\theta_0)$ of the members are plotted horizontally as abscissas. Point 45 has an abscissa $(\theta-\theta_0)=0$. Point 46 is 180° from point 45 and has an abscissa $(\theta-\theta_0)=180°$. Point 45' is simply a repetition of point 45. Its abscissa is $(\theta-\theta_0)=360°$. The vertical lines 47 are spaced one pitch apart and correspond to successive teeth of the internal member. The horizontal line 48 can be considered as representing the uniform velocity on the external member. The undulatory line 49 then denotes the fluctuating velocity of the internal member when a pair of teeth of the two members is in continuous contact as the parts which they connect revolve on their axes. Of course, the fluctuations are substantially the same regardless of which member moves at a uniform rate.

The velocity curve as well as the displacement curve are sine curves of twice the turning angle. This means that they are exactly the same after every half turn. If 45 is considered a start of an undulation, 46 is another start, 180° away from the first.

As well known to those familiar with mathematics, the displacement can also be measured by the area beneath the velocity curve 49. Starting with position 45, the displacement or turning angle of the internal member for a turning angle of one pitch of the external member can be measured by the shaded area shown in Fig. 6. The turning angle of one pitch of the external member corresponds to an area of the same width but of rectangular shape whose upper end would be the straight line 48. The shaded area is smaller than said rectangular area, which means that the assumed tooth contact moves the internal member through somewhat less than a whole pitch. However, after motion of the external member through one pitch, a pair of subsequent teeth have moved into contact and are in the position 45 so that the internal member has actually also been moved through one pitch and has been lifted away from contact at the previously engaged teeth.

It should be understood that the preceding analysis is based on rigid bodies without any elasticity, and that lack of contact should be taken in mathematical sense. Physical contact may still exist when the mathematical separation is so small that it can be overcome by elastic deflection of the contacting teeth and members.

Contact between the coupling members takes place on the teeth which stand out farthest by reason of the angularity of the shafts of the coupling members. The tooth having portion 45 is one such tooth. The area underneath the sine curve 49 from point 45 to the right is smaller than the corresponding area underneath the straight line 48 up to point 46. At this point the two areas are equal. Contact exists therefore at the two positions 45 and 46; that is, simultaneous contact exists on the two diametrically opposite teeth of the coupling members which correspond to these positions. The two teeth stay in contact as the motion proceeds, until they have moved through about half a pitch. Dotted line ordinates 47' to the right of points 45 and 46 indicate the positions when the engaging teeth pass out of contact.

One pitch to the left from said dotted lines 47' are other dotted lines 47'' which also fulfill the condition of contact. The area between said dotted lines 47' and 47'', which are one pitch apart and bounded on the top by the curve 49, is equal to the area between said dotted lines and bounded on top by straight line 48. There is therefore simultaneous contact on two adjacent teeth of a coupling member in each of the two diagonally opposite regions. The two teeth do not transmit exactly the same motion, however. The newly engaged tooth drives at a somewhat faster rate and therefore lifts the previously meshing teeth out of engagement.

The actual velocity diagram of the driven member of the coupling is as shown exaggerated in Fig. 7. With rigid bodies the velocity changes suddenly at each new tooth engagement as a pair of mating teeth arrive at the position of driving contact and the velocity curve is a serrated line such as shown at 49'. Whether or not these speed changes may be absorbed fully or partly by resilience of the parts can be estimated with the present analysis which determines the basic separations. It is also possible to estimate how many teeth carry the load.

When contact exists at positions 45, 46 (Fig. 6) which correspond to diametrically opposite teeth, the separation of adjacent mating teeth can be computed with formula 4 above which can also be written as:

$$d\alpha = \frac{(1-\cos m)}{2} \cdot \left[\tan \alpha + \frac{\cos 2(\theta-\theta_0)}{\cos \alpha}\right] \quad (4a)$$

$\theta - \theta_0$ is zero for positions 45, 46 and is equal to $360°/n$ plus or minus for adjacent teeth, where $n$ denotes the tooth number. The angular separation equals the difference of $d\alpha$ obtained for two angles, that is:

$$\frac{(1-\cos m)}{2 \cos \alpha}\left[1-\cos\frac{720°}{n}\right]$$

which gives the angular separation of adjacent teeth.

When $R_b$ denotes the radius 24—29' (Fig. 1), where mean normal 29—35 comes closest to axis 22, the linear separation measured normal to the tooth side is $$s = R_b \frac{(1-\cos m)}{2 \cos \alpha}\left[1-\cos\frac{720°}{n}\right] \quad (7)$$

For angularities of 1°, 2°, and 3° respectively, $(1-\cos n) = 0.00015, 0.00061,$
and $0.00137$, respectively.

The quantity within the brackets depends on the tooth member $n$. For an eighteen tooth coupling, for instance, $$\frac{720°}{n} = 40°$$

and the bracket quantity amounts to .23396. In conventional type tooth couplings and in the tooth coupling shown in Figs. 1 to 3, the angle $\alpha$ is the complement of the tooth pressure angle $\phi$. It is shown as 45° in Fig. 1. The cosine of 45° is 0.70711. Inasmuch as the quantity $\cos \alpha$ appears as a divisor in Equation 7 and inasmuch as the value of the cosine of an angle decreases with increase in size of the angle, it will be obvious that the smaller the pressure angle of the teeth of the coupling members, the larger the separation between the teeth. If the tooth pressure angle were 15°, for instance, $\alpha$ would be 75° and the cosine of $\alpha$ would then be 0.25882 which would mean that the tooth separations would be 2.732 times larger than with the shown pressure angle of 45°. The advantage of using increased pressure angle as is the case in couplings constructed according to the present invention is, therefore, evident.

For a pressure angle 45°, the computed separation of adjacent teeth of an eighteen tooth coupling is for instance only 0.0000248", 0.0001009", and 0.0002266", respectively, per inch of radius $R_b$ for angles $m$ of misalignment of the shafts equal 1°, 2°, and 3°, respectively. These separations are so small that they are apt to be overcome by elastic deflection. The reduction in tooth separation with couplings constructed according to the present invention are of additional advantage because the separation is a measure of the roughness of the transmitted motion or of the smoothness thereof.

It follows from Fig. 6 and from formula 4a which can be transformed into:

$$s = R_b \frac{(1-\cos m)}{2 \cos \alpha}[1 - \cos 2(\theta - \theta_0)] \quad (8)$$

that the maximum separation between adjacent teeth of the coupling is obtained when $\cos 2(\theta - \theta_0)$ has its maximum negative value of $(-1)$ that is, when $2(\theta - \theta_0) = 180°$ and $(\theta - \theta_0) = 90°$.

The maximum separation $$s_m = R_b \frac{(1-\cos m)}{\cos \alpha} \quad (9)$$

which, when $\alpha = 45°$, equals per inch of radius $R_b$ 0.00021", 0.00086", and 0.00194", respectively, for misalignment angles of 1°, 2°, and 3°, respectively.

The first mentioned maximum separation is small enough that it may be overcome by the elasticity of the parts. In that case, all the teeth carry the load but some of them carry more than others.

Where angle $\theta - \theta_0 = 45°$, $\cos 2(\theta - \theta_0) = \cos 90° = 0$, and the value $s$ is one half of $s_m$. One half of the teeth will carry the load when $\frac{1}{2} s_m$ is just at the limit of the elastic deflection or yield obtained.

The percentage of the teeth which carry the load and the load capacity increase with increasing pressure angle and with decreasing angle of misalignment of the axes of the connected parts. With a coupling constructed according to this invention, the radial tooth loads are balanced, and larger pressure angles do not mean more bearing loads as is the case with gears.

The minimum backlash required between teeth of a coupling constructed according to this invention can be determined from consideration of Fig. 4. Contact corresponding to position 45 (Fig. 6) is obtained when $\theta = \theta_0$, that is, when $$\theta = \frac{90° - \alpha}{2}$$

The center of curvature 35 of the contacting tooth sides is then in position 35'. If the external member is then moved to a position where the axes of the two shafts align, the center of curvature moves back from point 35' to point 35 and the previously contacting teeth will separate. The separation in the horizontal direction is equal to distance 35—35' on each of the two opposite tooth sides; and in the direction normal to the tooth sides it is equal to the projection of distance 35—35' to the tooth normal 35—37. The angle included between the line 35—35' and the normal 35—37, when $\theta = \theta_0$, equals:

$$(90° - \alpha - \theta_0) = 2\theta_0 - \theta_0 = \theta_0$$

The projection of distance 35—35' to the said normal therefore amounts to:

$$(35-35') \cos \theta_0 = (24-35) \cos^2 \theta_0 (1 - \cos m)$$

taking the value for distance (35—35') previously determined.

$$(24-35) = \frac{24-37}{\cos \alpha} = \frac{R_b}{\cos \alpha}$$

The minimum required backlash when the axes are aligned to stand shaft misalignment of $m$, is therefore per tooth side:

$$R_b \cdot \frac{(1-\cos m)}{\cos \alpha} \cdot \cos^2 \theta_0$$

where $$\theta_0 = \frac{90° - \alpha}{2}$$

The total minimum backlash required is then:

$$2R_b \frac{(1-\cos m)}{\cos \alpha} \cdot \cos^2 \theta_0 = 2s_m \cdot \cos^2 \theta_0$$

$$\cos^2 \theta_0 = \frac{1 + \cos 2\theta_0}{2} = \frac{1 + \sin \alpha}{2}$$

and the backlash is equal to:

$$R_b(1 - \cos m) \cdot \frac{1 + \sin \alpha}{\cos \alpha} \quad (10)$$

It is evident that the backlash required increases rapidly with increasing angles $\alpha$, that is, with reduced crowning. Very little backlash is required for small shaft angles on well crowned teeth.

When the axes of the shafts are misaligned, the tooth bearing shifts lengthwise of the teeth. The centers of tooth bearing can be obtained by projecting point 35', in a position $\theta = \theta_0$ (Fig. 2), to the corresponding tooth side of the internal member. 29' is the center of the tooth bearing. 35' is the position attained by the point 35 after setting the external member so that its axis is in misalignment with the axis of the internal member.

The shift of contact is moderate on well crowned teeth, but increases rapidly with reduction in the amount of crowning. The teeth should be long enough to contain safely the displaced position of contact when the axes of the coupling members are misaligned.

It is apparent from the above analysis that the motion transmitted by the coupling, when one pair of teeth only is assumed in contact, is identical with the motion of a spherical linkage, whose axes of rotation 22 and 23 as well as the link axes all intersect at one point 24. 34' is the link axis of one member and 34'' is the link axis of the other member. 34'' is drawn through center 24 perpendicular to a plane side tooth surface of the internal member which plane contains point of contact 29. The plane can be considered a surface of revolution having an axis 34''. The plane and conical tooth surfaces used on the two coupling members give an exact spherical solution.

Fig. 8 illustrates a modification of the invention in which both the internal member 50 and the external member 51 have teeth with curved side tooth profiles. The teeth of the internal member are denoted at 52 and the teeth of the external member at 53. The side surfaces 54 and 55 of the teeth of the internal member are of concave profile shape while the side surfaces 56 and 57 of the external member are of convex profile shape. 58 denotes the common tooth normal at mean point of contact 60 between mating teeth. The profile of the external member may be a circular arc centered at 61 and its tooth surface may be a spherical surface which can be considered a surface of revolution having an axis 62—61. 62 denotes the position of the axes of both internal and external members when in alignment. It is the intersection point of the axes when misaligned. The tooth profile of the internal member 50 may be a circular arc centered at 63 having a larger radius of curvature 60—63 than the tooth profile of the mating external member 51. The teeth of the internal member are longitudinally straight. Side tooth surfaces of the internal member 50 are, therefore, cylindrical surfaces. These can be considered more or less approximate surfaces of revolution whose axes pass through center 62. One such axis is shown at 65 to be parallel to the normal 58. The motion transmitted by this embodiment is substantially the same as that transmitted by the first described embodiment of the invention.

On account of the aforesaid approximation, a difference in profile curvature of the two members is imperative to avoid displacement of the tooth bearing to the top or bottom of the tooth profile. With moderate profile curvatures as shown, only a moderate difference in profile curvatures is required. If the coupling members had substantially curved profiles, like conventional involute gear profiles, substantial differences in profile curvature would be required, with the result that the two members would have merely point contact with one another. This would reduce the load carrying capacity of the coupling substantially.

In accordance with the present invention, the profile radius of the internal coupling member at a mean point 60 of the contacting tooth surfaces is larger than half the distance 60—62 of said mean point from the axis 62 of the coupling member and larger than one half of the outside radius of the external coupling member 51, usually much larger.

Figure 9:
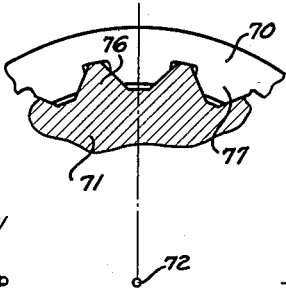
Fig. 9 is a fragmentary view showing a coupling designed according to a still further modification of the invention.
Figure 10:
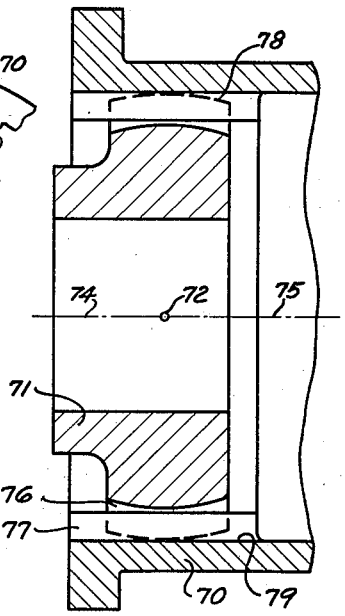
Fig. 10 is a sectional view of this latter coupling, taken at right angles to the view of Fig. 9.

A further modification of the invention is illustrated in Figs. 9 and 10. Here positive means are used to make the axes of the two members intersect in the same point 72 regardless of the misalignment of the axes of the two members. The internal member is designated 70 and the external member 71. The point 72 is a point lying in a transverse plane which is perpendicular to the axis 74 of the external member at a point midway between the ends of the teeth 76 of the external member. The axis of the internal member is denoted at 75 and its teeth at 77. The side surfaces of the teeth of the internal member may be plane or may be curved as in the previously described embodiments of the invention. The external member is formed with an outside spherical surface 78 whose center is at 72 and the teeth of this member are so proportioned for thickness that the outside spherical surface 78 bears against the cylindrical inside surface 79 of the bottoms of the tooth spaces of the internal member 70. Positive centering of the two coupling members relative to one another is thus obtained regardless of the angular position of the axis of the external member with reference to the axis of the internal member of the coupling.

Figure 11:
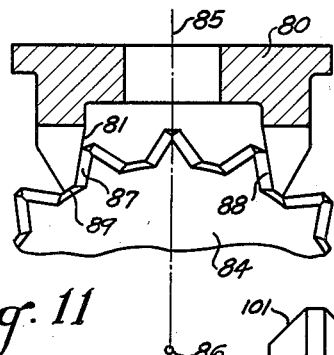
Fig. 11 is a view illustrating one way of producing the external member of a coupling constructed according to this invention.

One way of producing an external coupling member according to this invention is illustrated in Fig. 11. Here a face mill type cutter 80 is employed having inside cutting edges 81. This cutter is so positioned relative to the external coupling member 84 to be cut that its axis 85 intersects the axis 86 of the coupling member at a point midway between the ends of the teeth of the coupling member. Opposite sides 87 and 88 of spaced teeth of the coupling member 84 are then cut simultaneously by the inside cutting edges 81 of the cutter, the cutter being rotated on its axis 85 while a relative depthwise feed movement is effected between the cutter and the work in the direction of axis 85. At full depth position the final tooth shape is produced on the work and is a counterpart of the internal cutting surface of the cutter, that is, of the surface described by the inside cutting edges 81 of the cutter as it rotates on its axis. The tooth surfaces 87 and 88 produced on opposite sides of spaced teeth of the work are, therefore, common conical surfaces whose axis is at 85. After one pair of opposite sides of spaced teeth of the coupling member have been cut, the cutter is withdrawn from engagement with the work, and the work is indexed. Then the feed begins anew to cut another pair of opposite sides of spaced teeth of the coupling member. So the operation may proceed until all of the tooth sides have been cut.

The tip cutting edges 89 of the cutter cut the bottom of the tooth spaces of the work and constitute approximately a spherical surface whose center is approximately at the point 86 of intersection of the axes of the cutter and work, namely, at a point lying on the axis of the work approximately midway between the ends of the teeth of the work.

It will be obvious that the tooth surfaces of the member 84 can be ground instead of cut, with an annular grinding wheel having a grinding surface the same as the cutting surface of cutter 80, by effecting the same motion between the wheel and the work as described between the cutter and the work. In fact, since the grinding wheel is a cutter having an infinite number of cutting edges, when the terms "cutter" or "cutting edges" are used either in the present specification or in the claims, it will be understood that they are intended to include grinding wheels and grinding edges.

The internal member with its longitudinally straight teeth may be produced in any suitable known way such as by broaching, shaping, or other methods.

Figure 12:
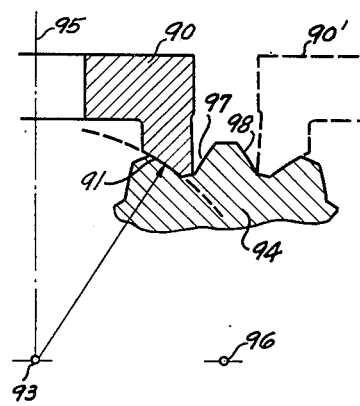
Fig. 12 is a diagrammatic view illustrating another way of producing the external member of the coupling.

Fig. 12 illustrates another way of cutting the tooth surfaces of the external member of the pair. A face mill cutter 90 is used here whose axis 95 is offset from the axis 96 of the coupling member 94 to be cut. In the case shown in Fig. 12 the coupling member 94 has teeth whose opposite side surfaces 97 and 98 are of convex circular arcuate profile shape. Cutter 90 cuts the side surfaces of the teeth with its inside cutting edges 91 which in the rotation of the cutter trace a spherical surface whose center is at 93. The side tooth surfaces of the work are cut by rotating the cutter on its axis 95 and simultaneously effecting relative depthwise feed movement between the cutter and work in the direction of the axis 95. Accordingly, the side tooth surfaces produced on the work are spherical surfaces. One side surface of the teeth in this embodiment of the invention is cut at a time. After cutting one side of all the teeth with the cutter positioned in the full line position shown in Fig. 12, the cutter is reset to the dotted line position indicated at 90' and the other sides of the teeth are then cut.

Figures 13, 14:
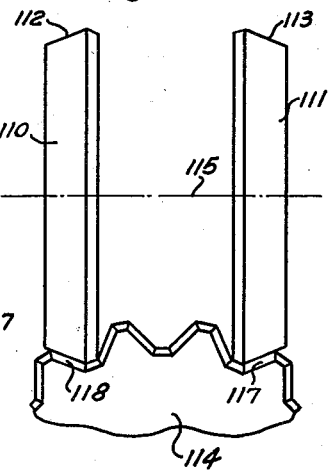
Figs. 13 and 14 illustrate still further ways of producing the external member of the coupling.

Fig. 13 illustrates a still further method of cutting the external member of a coupling. Here the cutter employed is a disc milling cutter 100 having its opposite side cutting edges lying in conical surfaces 101 and 102, respectively, whose axis coincides with the axis 105 of the cutter. The cutter is adapted to cut opposite sides of a tooth space of the work 104 simultaneously. Cutting is effected by rotating the cutter on its axis 105 while moving the cutter relative to the work from one end of the tooth space to the other about an axis 106 which is parallel to axis 105 and which passes through a point 103 lying on the work axis and midway between the ends of the teeth of the work. Opposite side tooth surfaces 107 and 108 of the coupling member are, then, concentric conical surfaces.

Fig. 14 shows still another method of cutting the tooth surfaces of the external coupling member 114. Here two cutters 110 and 111 are employed which have their side-cutting edges arranged in conical surfaces 112 and 113, respectively. The cutters are mounted to rotate on a common axis 115 so that their side-cutting surfaces 112 and 113, respectively, cut opposite side tooth surfaces 117 and 118 of spaced teeth of the work, respectively, simultaneously. In the cutting operation the cutters are rotated on their common axis 115, and simultaneously fed relative to the work 114 about an axis 116 which is parallel to axis 115 and which intersects the axis of the work in a point 118 that lies approximately midway the ends of the teeth of the work. The teeth produced on the external coupling member 114 are more crowned than those produced in accordance with the method of Fig. 13 because of the spacing of the cutters.

Fig. 15 illustrates diagrammatically how a spiral bevel gear cutting machine constructed according to the Carlsen and Johnson Patent No. 2,354,181 of July 25, 1944, may be employed for cutting the external member of a clutch according to this invention with a disc milling cutter or cutters. In this machine, the cutter is mounted upon a spindle which is journaled in an eccentric carrier that in turn is journaled in an oscillatory cradle, and the work is mounted on a spindle which is journaled in a workhead that is adjustable angularly on the base of the machine about an axis which intersects the axis of the cradle. The eccentric carrier is movable about an axis parallel to the axis of the cradle to vary the radial distances between the axis of the cutter spindle and the axis of the cradle.

When the machine is set up for cutting an external member with a disc milling cutter according to this invention, the cutter 100 is secured to the cutter spindle whose axis 105 is parallel to the axis 120 of the cradle. In the view of Fig. 15 the cutter axis and cradle axis project into the same line. The work 104 is mounted on a suitable arbor 121 that is secured in the work spindle 122 which is journaled in the workhead 123. The workhead 123 is here positioned so that its axis 124 intersects the axis 120 of the cradle 126 at right angles.

One way of operation of the machine is shown in Fig. 16 which is a partial front view corresponding to Fig. 15. The cutter 100 while being rotated on its axis 105 is fed about the cradle axis 120, through oscillation of the cradle, from the dotted line position 100' to the full line position 100. Then the eccentric carrier is slightly shifted automatically to set the cutter axis closer to the cradle axis, and the cradle is swung back to initial position so that the cutter may take a light recut on the work during the return movement of the cradle. When the cutter has cleared the work, the cutter is returned to initial depthwise position and the work is indexed. Then the swing movement of the cradle begins anew to allow the cutter to cut another tooth space of the work.

Another way of using the machine described to cut an external coupling member is illustrated in Fig. 17. Here the cutter is again rotated on its axis 105 while the cradle is swung on its axis 120. In the method illustrated in Fig. 17, however, the automatic set-over of the eccentric carrier to move the cutter axis toward the cradle axis, is effected at the start of the roll and is produced so slowly that nearly full cutting depth at one end of a tooth space of the work is reached by cutting during this set-over. In this set-over of the eccentric carrier during the cradle motion, the cutter center moves from position 105' to position 105''. The final shape of the sides of the tooth space is then produced while the cutter axis in moving in the path 105''—105 about the axis 120 of the cradle with the eccentric carrier held stationary on the rocking cradle. The cutter is then set away from the cradle axis and does not cut upon the return roll.

In both cases, illustrated in Figs. 16 and 17 both sides of the tooth space are cut in one operation.

Several different embodiments of the invention have been described. It will be understood, however, that the invention is capable of still further modification and this application is intended to cover any variations, uses, or adaptations of the invention following, in general, the principles of the invention and including such departure from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of cutting a tooth surface of the external member of a tooth coupling consisting of external and internal members, which comprises positioning a face mill cutter, that has inside cutting edges that are inclined to the axis of the cutter, so that its axis extends in a direction perpendicular to the axis of the work, and rotating the cutter in engagement with the work while effecting a relative depthwise feed movement between the cutter and work in the direction of the tool axis to cause the cutter to cut with its inside cutting edges longitudinally convex tooth surfaces on the work.

2. The method of cutting the tooth surfaces of the external member of a toothed coupling, which comprises positioning a face mill cutter, that has inside cutting edges inclined to its axis, so that the axis of the cutter is perpendicular to and intersects the axis of the work, and rotating the cutter in engagement with the work while effecting a relative depthwise feed movement between the cutter and work to cut simultaneously opposite sides of spaced teeth of the work with said inside cutting edges.

3. The method of cutting the tooth surfaces of a generally cylindrical external toothed member which comprises positioning a face mill cutter that has inside cutting edges of straight profile inclined to its axis, in engagement with the work so that the axis of the cutter extends at right angles to and intersects the axis of the work in a point midway between the ends of the teeth of the work, and so that the cutter will operate simultaneously in spaced tooth spaces of the work, and rotating the cutter in engagement with the work while effecting a relative depthwise feed movement between the cutter and work to cut simultaneously opposite sides of spaced teeth of the work.

4. The method of cutting side tooth surfaces of the external member of a toothed coupling, which comprises employing a disc milling cutter that has side-cutting edges inclined to its axis, positioning said cutter in engagement with the work with its axis extending in a direction perpendicular to the axis of the work, and rotating the cutter on its axis while effecting a relative swinging movement between the cutter and work about an axis parallel to the axis of the cutter and intersecting the work axis in a point midway between the ends of the teeth of the work.

5. The method of cutting side tooth surfaces of the external member of a toothed coupling, which comprises employing a pair of disc milling cutters, each of which has side-cutting edges that are of straight profile shape and inclined to its axis, mounting said cutters coaxially so that their side-cutting edges will operate simultaneously upon opposite sides of spaced teeth of the work, rotating the cutters in engagement with the work and simultaneously imparting a relative swinging movement between the cutters and the work about an axis parallel to the axis of the cutters and perpendicular to the axis of the work and intersecting the work axis in a point intermediate the ends of the teeth of the work.

6. The method of cutting the tooth surfaces of a generally cylindrical externally toothed member which comprises positioning a face mill cutter, that has inside cutting edges which are inclined to its axis, in engagement with the work so that the axis of the cutter extends at right angles to and intersects the axis of the work in a point intermediate the ends of the teeth of the work, and so that the cutter will operate simultaneously in spaced tooth spaces of the work, and rotating the cutter in engagement with the work.

7. The method of cutting the tooth surfaces of a generally cylindrical externally toothed member which comprises positioning a face mill cutter, that has inside cutting edges that are inclined to its axis, and that has tip cutting edges which lie in a spherical surface, in engagement with the work so that the axis of the cutter extends at right angles to and intersects the axis of the work, and so that the cutter will operate simultaneously in spaced tooth spaces of the work, and rotating the cutter in engagement with the work while effecting a relative depthwise feed movement between the cutter and work until the center of the spherical surface, which contains the tip cutting edges of the cutter, is approximately at the point of intersection of the axes of the cutter and work, to cut simultaneously opposite sides of spaced teeth of the work.

8. The method of cutting side tooth surfaces of a generally cylindrical externally toothed member, which comprises employing a disc milling cutter that has opposite side cutting edges that are inclined to its axis, positioning said cutter in engagement with a tooth space of the work with its axis extending in a direction perpendicular to the axis of the work, and rotating the cutter on its axis, while effecting a relative swinging movement between the cutter and work about an axis parallel to the axis of the cutter and intersecting the work axis in a point between the ends of the teeth of the work.

9. The method of cutting side tooth surfaces of a generally cylindrical, externally toother member, which comprises positioning a pair of disc milling cutters, each of which has side-cutting edges that are inclined to its axis, so that opposite side cutting edges of the cutters will operate simultaneously upon opposite sides of spaced teeth of the work, rotating the cutters in engagement with the work, and simultaneously imparting a relative swinging movement between the cutters and the work about an axis parallel to the axis of the cutters and perpendicular to the axis of the work and intersecting the work axis in a point between the ends of the teeth of the work.

ERNEST WILDHABER.

REFERENCES CITED

The following references are of record in the file of this patent:

UNITED STATES PATENTS

| Number | Name | Date |
|---|---|---|
| 320,179 | Schulze-Berge | June 16, 1885 |
| 1,788,639 | Stonebraker | Jan. 13, 1931 |
| 2,035,171 | Loewus | Mar. 24, 1936 |
| 2,035,434 | Loewus | Mar. 24, 1936 |
| 2,286,709 | Barcus | June 16, 1942 |
| 2,303,813 | Barcus | Dec. 1, 1942 |
| 2,334,366 | Wildhaber | Nov. 16, 1943 |
| 2,393,727 | Aber | Jan. 29, 1946 |